Nov. 9, 1965  R. J. HARRISON  3,217,087
ENCASED ELECTRICAL COMPONENT
Filed March 19, 1962
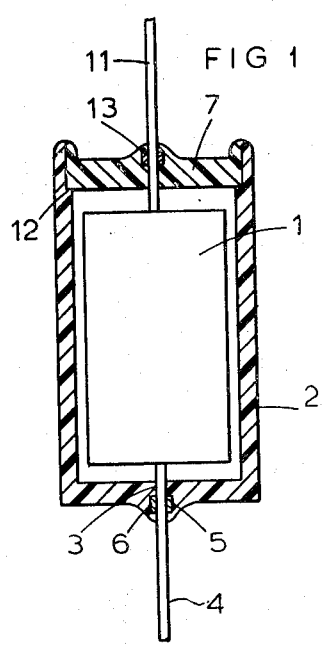
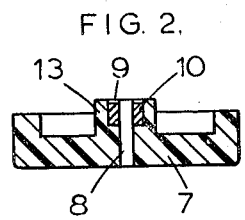
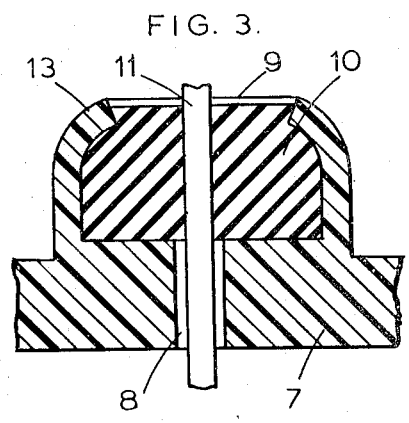
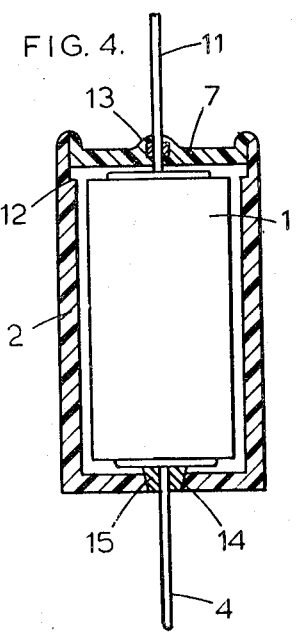
INVENTOR.
REGINALD J. HARRISON
BY
Connolly and Hutz
HIS ATTORNEYS

3,217,087
ENCASED ELECTRICAL COMPONENT

Reginald J. Harrison, Southall, Middlesex, England, assignor to Sprague Electric Company, North Adams, Mass., a corporation of Massachusetts
Filed Mar. 19, 1962, Ser. No. 180,772
Claims priority, application Great Britain, Mar. 17, 1961, 9,924/61
1 Claim. (Cl. 174—52)

This invention relates to encased electrical components, and more particularly to plastic cased electrical components having fluid-tight closure members permitting the axial extension of lead-wires through the ends of the component.

Plastic cased electrical components have been known to the art for a number of years. The major drawback to the plastic cased electrical components of the prior art has been the lack of success in producing fluid-tight seals around the lead-wires which extend from the component package. Various complex and costly sealing means have been employed without attaining the high degree of success required to ensure continued commercialization of the components.

It is another object of this invention to overcome the above and related deficiencies of the prior art.

It is another object of this invention to provide a plastic cased electrical component of fluid-tight construction.

It is a still further object of this invention to provide a fluid-tight seal around a lead-wire extending from the end of a plastic cased electrical component.

These and other objects of this invention will become more apparent upon consideration of the following description taken together with the accompanying drawing, in which:

FIGURE 1 is a vertical section of a plastic encased electrical component constructed according to this invention;

FIGURE 2 is a sectional view of a closure disc which forms a preferred embodiment of this invention;

FIGURE 3 is an enlarged fragmentary view of a lead-wire sealed in fluid-tight relationship to the seal shown in FIGURES 1 and 2; and FIGURE 4 is a vertical sectional view of an electrical component having another seal embodiment of this invention.

In general, the objects of this invention are obtained by an electrical component having a lead-wire extending through a compressed bung of resilient material located in a thermoplastic casing. More particularly, the objects of this invention are attained by an electrical component having a casing of thermoplastic material with a lead-wire of the component passing out of the casing through a bung of rubber or like material which is compressed to form a fluid-tight seal around the lead-wire by the application of heat and pressure to the thermoplastic material adjacent the bung.

Referring to FIGURE 1, an electrical component 1, such as a capacitor, is enclosed within a casing 2 of thermoplastic material; one end of the casing is closed except for an aperture 3 through which a lead-wire 4 extends from the component 1. Within a recess 5 concentric with the aperture 3, there is located a bung 6 of rubber or like resilient material. These components being thus assembled, heat and pressure are applied to the material of the casing in such a manner as to compress the bung 6 and cause it to form fluid-tight contact both with the casing 2 and with the lead-wire 4; on the casing being allowed to cool, the bung is retained in compression.

At the other end, the casing 2 is closed by a disc 7, seen separately in FIGURE 2, provided with a corresponding aperture 8, recess 9 and resilient bung 10. After the disc 7 has been threaded over a lead-wire 11 to rest on an internal shoulder 12 of the casing, heat and pressure are applied to deform the wall 13 of the recess 9; whereby, as indicated in FIGURE 3, the bung 10 is compressed around the lead-wire 11. Preferably, the heat and pressure are so applied as to cause the material of the disc 7 to coalesce with that of the casing 2, as indicated in FIGURE 1. For this latter purpose, it is advantageous if the casing and the disc are of the same substance, for instance, polystyrene, polyethylene or polypropylene, the latter being particularly suitable for units required to operate at relatively high temperatures.

The heat and pressure required for the above sealing effect are suitably applied by a press tool heated to a temperature somewhat above that of the softening point of the thermoplastic material. It may be necessary to chill the tool, by an air blast, for example, prior to its removal from the work, in order to render the material solid before the constraint of the tool is removed. If the softened material is left for too long without constraint, the elasticity of the bung may operate to release its compression around the lead-wire. On the other hand, if the tool is well polished it is possible to operate so slightly above the material's softening point, that, on withdrawal of the tool, the material hardens before any appreciable return of the bung to its original form is possible.

In the modification depicted in FIGURE 4 one end of the casing 2 is closed by a disc 7 as before; at the other end the casing is formed with a tapered aperture 14 accommodating a resilient bung 15. In assembly, the bung 15 is placed over the lead-wire 4 which is then threaded through the aperture 14. On insertion of the element 1 in the casing 2, axial pressure sufficient to compress the bung 15 to form a hermetic seal with lead-wire 4 and casing 2 is thereupon applied via the element proper 1 of the component, on which the closure disc 7 rests rather than on the shoulder 12, if present. Heat and pressure are then applied to the disc 7 as above described.

It will be understood that various modifications may be made within the concept of this invention which is limited only by the scope of the appended claim.

What is claimed is:

An electrical component comprising a device having a lead-wire extending therefrom, said device positioned within a casing of thermoplastic material, said casing having closed ends of thermoplastic material, at least one of said ends having an outwardly extending generally tubular extension of thermoplastic material with its exterior end deformed over a resilient bung located within said tubular extension, said lead-wire extending outwardly from said device through said tubular extension in intimate contact with said bung, said tubular extension being deformed against said bung for retaining said bung under compression whereby a fluid-tight seal is maintained around said lead-wire.

(References on following page)

References Cited by the Examiner

UNITED STATES PATENTS

| | | |
|---|---|---|
| 2,392,311 | 1/46 | Christopher. |
| 2,970,182 | 1/61 | Miquelis. |
| 3,019,376 | 1/62 | Kurland et al. _____ 174—52 X |
| 3,064,070 | 11/62 | Douglass et al. _____ 174—52 |
| 3,107,197 | 10/63 | Stein et al. |
| 3,148,240 | 9/64 | Harrison _____ 317—242 X |

FOREIGN PATENTS

| | | |
|---|---|---|
| 522,607 | 9/53 | Belgium. |
| 1,011,013 | 6/52 | France. |
| 762,807 | 5/52 | Germany. |
| 611,526 | 11/48 | Great Britain. |
| 633,387 | 12/49 | Great Britain. |

JOHN F. BURNS, *Primary Examiner.*

JOHN P. WILDMAN, LARAMIE E. ASKIN,
*Examiners.*